E. H. ANGLE.
ORTHODONTIC APPLIANCE.
APPLICATION FILED DEC. 12, 1917.
1,261,339. Patented Apr. 2, 1918.
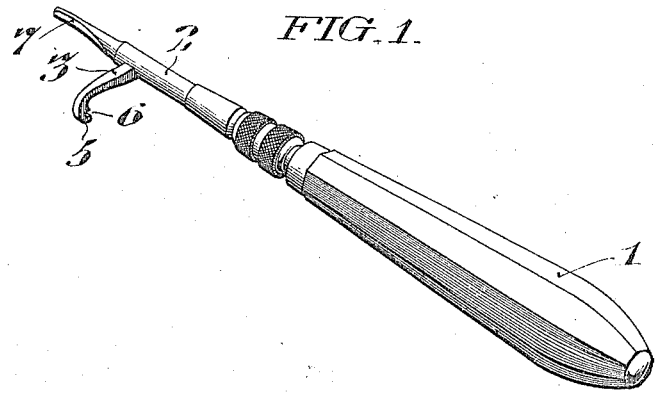
FIG. 1.
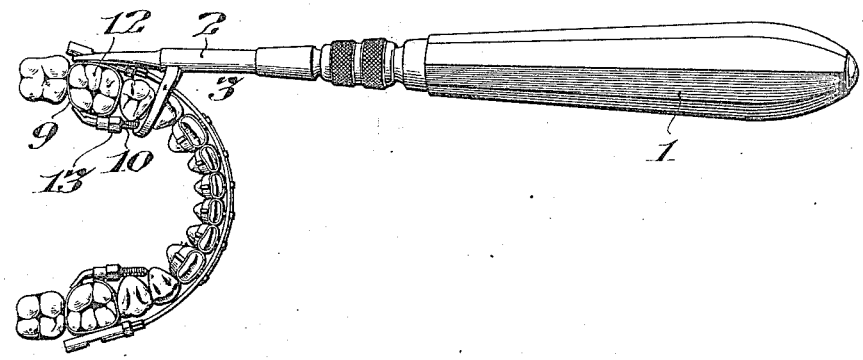
FIG. 2.

FIG. 5.

Inventor
Edward H. Angle.
Witness

UNITED STATES PATENT OFFICE.

EDWARD H. ANGLE, OF PASADENA, CALIFORNIA.

ORTHODONTIC APPLIANCE.

1,261,339.

Specification of Letters Patent.

Patented Apr. 2, 1918.

Application filed December 12, 1917. Serial No. 206,741.

*To all whom it may concern:*

Be it known that I, EDWARD H. ANGLE, a citizen of the United States, and a resident of Pasadena, in the county of Los Angeles, State of California, have invented certain new and useful Improvements in Orthodontic Appliances, of which the following is a specification, reference being had to the accompanying drawings.

My invention relates particularly to that class of implements that are adapted to facilitate the placing or adjustment of tooth positioning devices, and is particularly directed to the manipulation of the anchor-bands.

The principal object of my invention is to provide an implement by which the anchor-band or other tooth-engaging means may conveniently be rotatably adjusted upon the tooth and held in proper position while being adjustably clamped to the tooth.

Other objects of my invention are, to provide an implement of the class described having members so correlated as to afford free access to the clamping mechanism of the tooth-band, and so formed as to afford freedom of movement without interference with the patient's teeth.

Specifically stated the form of my invention as hereinafter described, comprehends an implement of the class described having a shank arranged to engage the exterior of an anchor-band, while its laterally extending arm provided with a claw engages the free end of the threaded shank of said anchor-band within the dental arch for the purpose of rotating or twisting said anchor-band into proper position upon the anchor tooth.

My invention also includes all of the various novel features of construction and arrangement as hereinafter more definitely specified.

Figure 3:
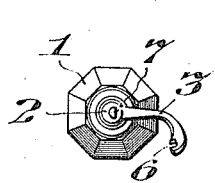
Figure 4:
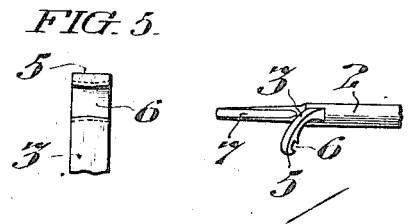
Figure 6:
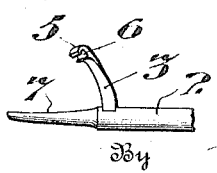

In the accompanying drawings Figure 1 is a perspective view of a dental implement constructed in accordance with my invention; Fig. 2 is a plan view of the lower dental arch having an orthodontic appliance attached thereto, and showing the dental implement illustrated in Fig. 1 applied to the terminal anchor-band and holding it in proper position to be clamped; Fig. 3 is an end elevational view of the dental implement shown in Figs. 1 and 2; Fig. 4 is a fragmentary side elevational view of the forward end of the shank of said implement; Fig. 5 is an enlarged inverted fragmentary plan view of the claw; and Fig. 6 is a fragmentary inverted plan view of the forward end of the shank of said implement.

In said figures the anchor-band placing or adjusting implement comprises the handle 1, shank 2 and laterally extending arm 3 which tends to incline forwardly and curvedly deflects about an axis substantially parallel with the axis of said shank 2, terminating in a claw 5 which is formed by the undercut slot 6. The shank 2 preferably tapers toward its free end and is provided with the flat side 7, toward which it tends to curve in the plane of the arm 3, whereby a firm bearing is afforded when engaged with the curved exterior surface of the anchor-band 9, as shown in Fig. 2.

The claw 5 is arranged to grasp the free end of the threaded shank 10, of the anchor-band 9, and as shown in Fig. 2, hold it as close as possible to the inner surface of the teeth of the dental arch while it is being clamped to the anchor tooth 12, by rotating the nut 13 on said threaded shank 10 in a manner well known to the profession.

By thus rotatably twisting the anchor-band upon the anchor tooth while it is being clamped, obviously, the projecting end of the threaded shank 10 of the anchor-band 9 will be permanently restrained from unnecessary interference with the tongue of the patient.

As best shown in Fig. 2, the implement is arranged to be disposed in an inclined relation to the occlusal plane thus affording free use of the laterally projecting arm 3, which is adapted to extend across the row of teeth of the dental arch as shown and therefore it is found expedient to incline the slot 6 in a plane which intersects the axis of the shank 2, whereby its undercut wall will substantially aline with the threaded shank 10.

It is found advantageous to so form the slot 6 that it broadens toward its opposite ends as shown in Fig. 5, whereby it may be better adapted to the slightly differing conditions to be found in applying different anchor-bands.

My invention is designed to obviate that difficulty long known to the profession, which consists in the tendency of the free end of the threaded shank of the anchor-bands to swing lingually when being clamped to the anchor tooth.

I do not desire to limit my invention to the precise details of construction and arrangement herein set forth, as it is obvious that various modifications may be made therein without departing from the essential features of my invention as defined in the appended claims.

Having thus described my invention, I claim:

1. An implement of the class described, having a shank, and a laterally projecting arm providing a hook adapted to grasp an anchor-band.

2. An implement of the class described, having a shank adapted to bear upon an anchor-band, and a laterally projecting arm extending forwardly and forming a hook arranged to engage the projecting shank of said anchor-band.

3. An implement of the class described, having a shank, and a laterally projecting arm curved about an axis extending substantially parallel with said shank, and providing a hook.

4. An implement of the class described, comprising a shank, and a curvedly projecting arm having a slot at its free end extending obliquely with respect to the axis of said shaft.

5. An implement of the class described, comprising a shank having its forward portion flattened to engage a tooth-anchor exterior of the dental arch, and an arched extension projecting laterally and providing a hook arranged to engage the threaded shank of said tooth-anchor within the dental arch.

6. An implement of the class described, comprising a shank having its free end tending to curve laterally, and an arm projecting laterally from said shank in substantially the plane of said curve, and having its free end curving from said plane, and providing a hook arranged to engage the threaded shank of an anchor-band, while the curved shank engages the exterior of said anchor-band.

In witness whereof, I have hereunto set my hand this 4th day of December, A. D. 1917.

EDWARD H. ANGLE.

Witnesses:
M. FAY,
V. M. MORGAN.

Copies of this patent may be obtained for five cents each, by addressing the "Commissioner of Patents, Washington, D. C."